(No Model.)
H. SUMMERFELD.
FANNING MILL.
No. 359,945. Patented Mar. 22, 1887.
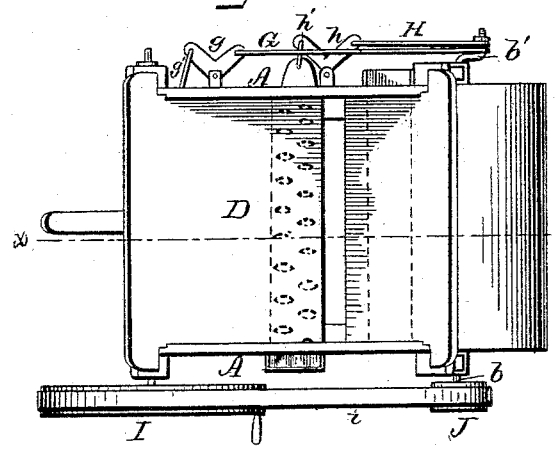
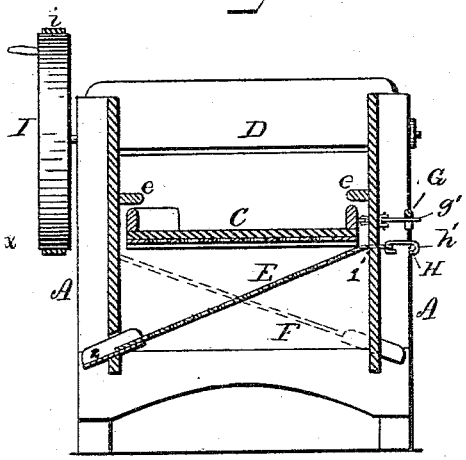
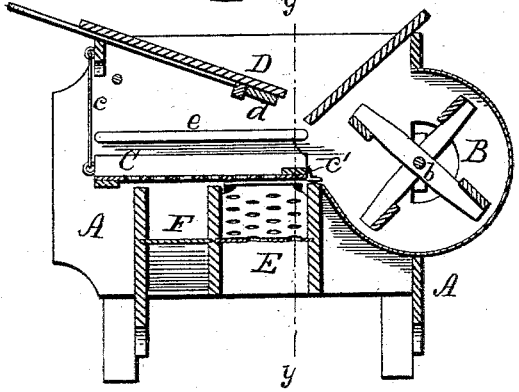
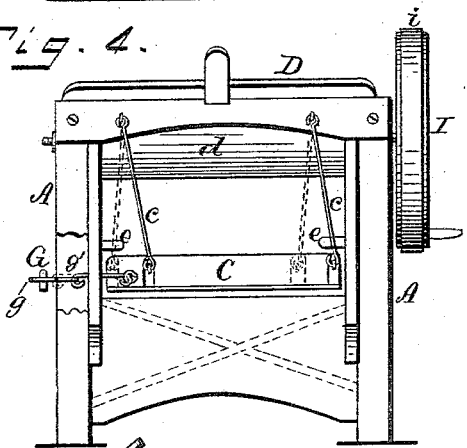
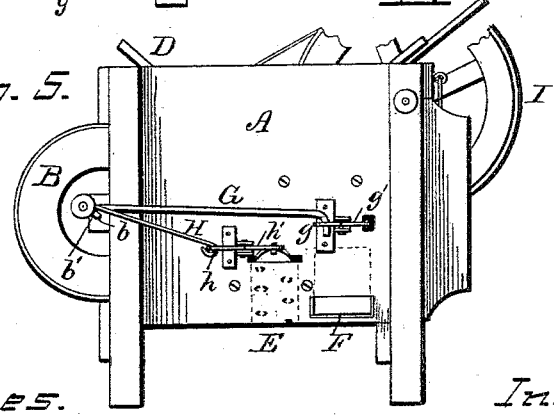
Witnesses.
Douglass S. Mackall,
J. B. Johns,
Inventor.
Hinrich Summerfeld
by Henry Wise Garnett
Atty.

UNITED STATES PATENT OFFICE.

HEINRIH SUMMERFELD, OF CANTON, ASSIGNOR TO JOHN C. HAMILTON, OF McPHERSON, KANSAS.

FANNING-MILL.

SPECIFICATION forming part of Letters Patent No. 359,945, dated March 22, 1887.

Application filed September 3, 1886. Serial No. 212,640. (No model.)

*To all whom it may concern:*

Be it known that I, HEINRIH SUMMERFELD, a citizen of the United States, residing at Canton, in the county of McPherson and State of Kansas, have invented certain new and useful Improvements in Fanning-Mills; and I do hereby declare the following to be a full, clear, and exact description of the invention, such as will enable others skilled in the art to which it appertains to make and use the same.

My invention relates to improvements in fanning-mills or grain-separators in which the grain is exposed to a blast of air from a fan as it passes from a hopper to and through a series of vibrating sieves; and my said invention consists in certain details of construction and arrangement of the parts composing said mill, whereby a thorough separation of the chaff and other impurities from the good grain is effected and the different qualities of grain are discharged from separate chutes situated at opposite sides of the machine, all as and for the purposes as will hereinafter more fully appear, and be pointed out in the claims.

The object of this invention is to so arrange and construct the parts that while they will be few in number and simple in construction and arrangement, yet the desired result will be accomplished—that of properly cleaning the grain; also, the machine will be within the reach of farmers of limited means, and little outlay will be required for repairs, which only occur through the natural wear of the parts, and may be effected without the employment of skilled labor.

Reference is had to the accompanying drawings for a better understanding of the details of construction and arrangement of the parts composing a fanning-mill or grain-separator when constructed in accordance with my invention, wherein—

Figure 1 represents a plan view of my mill; Fig. 2, a vertical central longitudinal sectional elevation on the line $x\ x$ of Fig. 1; Fig. 3, a vertical transverse sectional elevation on the line $y\ y$ of Fig. 2; Fig. 4, an end, and Fig. 5 a side, elevation.

A A represent the outer case or frame of the machine, which may be of any desired or appropriate dimensions, having at one end the usual blast-fan, B, upon an axle, $b$, the centrally-arranged vibrating screen-frame C, and hopper D. The hopper D has a sliding bottom, $d$, for gaging the amount of feed, and the screen-frame C is supported by hangers $c\ c$ at its outer end and rests upon a pivot, $c'$, at its inner end, whereby the outer end only of said frame is capable of vibration.

E F are the grain-chutes, which are oppositely inclined, as shown in Fig. 3, so that they discharge upon opposite sides of the machine. The chute F is the one for the first quality of grain, while the one E, which is for the smaller grain, is supplied with a perforated and vibrating bottom, which bottom is supported at its top end in a slot in the casing of the machine, through which it passes, at at 1, and at its lower end upon the discharge-spout 2, as shown in Fig. 3. Two or more sieves or screens of varying fineness may be employed in the screen-frame C, and over the edges of the said frame are fender-strips $e\ e$, Figs. 2 and 4, to prevent the escape of grain, &c., at the sides of the screen-frame.

The required vibrating motion for the screen-frame C and bottom of chute E is effected through connection with the fan-shaft $b$ in the following manner: Upon one end of the fan-shaft $b$ is a crank, $b'$, upon which are secured two separate pitman-rods, G and H, the one G being somewhat longer than the one H, and each of them engaging bell-cranks $g\ h$, secured upon the side of the machine, as seen in Figs. 1 and 5, which bell-cranks in turn are connected by short rods $g'$ and $h'$ to the screen-frame C and bottom of chute E, respectively, whereby the movement of said parts is accomplished.

The movement of the fan-shaft is effected by a large band power-wheel, I, at the end of the machine opposite the fan, which is connected to said fan-shaft by a belt, $i$, passing over a pulley, J, thereon.

As will be seen, the parts are few in number and simple in construction, and therefore not liable to become easily injured.

The operation is as follows: The grain fed into the hopper D escapes therefrom upon the screens in the screen-frame C, where it is subjected to the blast from the fan, and the chaff, dust, and lighter particles are carried off by said blast to the rear of the machine. Passing the first screen, the large heavy grain enters the chute F and is discharged upon one side of the machine, while the smaller grain and finer impurities enter the chute E, and as they pass down the same they are subjected to a second agitation, which tends to further separate smaller grains and impurities therefrom, and is discharged upon the opposite side of the machine from that of the good grain, while the screenings, &c., are deposited beneath the machine.

Having thus fully described my invention, what I claim as new therein, and desire to secure by Letters Patent of the United States, is as follows, viz:

1. A fanning-mill comprising the frame A, hopper D, fan B, vibrating screen-frame C, hangers c, supporting the outer end, and a central pivot, c', supporting the inner end of said screen-frame, the oppositely-inclined chutes E and F, the chute F having a closed bottom and the one E having a perforated bottom, and means for vibrating the screen-frame and the perforated bottom, substantially as described, for the purposes specified.

2. A fanning-mill comprising the frame A, hopper D, fan B, vibrating screen-frame C, hangers c, supporting the outer end, and a central pivot, c', supporting the inner end of said screen-frame, oppositely-inclined chutes E and F, the one E having a perforated bottom, the fan-shaft b, crank b' at its end, pitman-rods G H, bell-cranks g h, and connections g' h', for effecting the movement of the screen-frame and bottom of discharge-chute, substantially as described, for the purposes specified.

HEINRIH SUMMERFELD.

Witnesses:
FRANK A. BRIDGE,
J. R. DEAN.